United States Patent

Razavi Majomard et al.

(10) Patent No.: US 11,637,713 B1
(45) Date of Patent: Apr. 25, 2023

(54) ENERGY-EFFICIENT ETHERNET TRANSCEIVER THAT ADJUSTS BASED ON ENVIRONMENTAL CONDITIONS

(71) Applicant: Marvell Asia Pte, Ltd., Singapore (SG)

(72) Inventors: Seid Alireza Razavi Majomard, Belmont, CA (US); Ravi Pathakota, Fremont, CA (US); Mohit Singh, Milpitas, CA (US); Ehab Tahir, Mississauga (CA)

(73) Assignee: Marvell Asia Pte, Ltd., Singapore (SG)

( * ) Notice: Subject to any disclaimer, the term of this patent is extended or adjusted under 35 U.S.C. 154(b) by 136 days.

(21) Appl. No.: 17/248,912

(22) Filed: Feb. 12, 2021

Related U.S. Application Data

(60) Provisional application No. 62/976,981, filed on Feb. 14, 2020.

(51) Int. Cl.
*H04L 12/10* (2006.01)
*H04L 43/08* (2022.01)
*H04L 7/00* (2006.01)
*H04L 69/323* (2022.01)

(52) U.S. Cl.
CPC ............ *H04L 12/10* (2013.01); *H04L 7/0008* (2013.01); *H04L 43/08* (2013.01); *H04L 69/323* (2013.01)

(58) Field of Classification Search
CPC ....... H04L 12/10; H04L 7/0008; H04L 43/08; H04L 69/323
See application file for complete search history.

(56) References Cited

U.S. PATENT DOCUMENTS

| 9,203,730 | B1 * | 12/2015 | Johnson | .................. H04L 43/50 |
| 10,892,880 | B1 | 1/2021 | Dalmia | |
| 11,395,225 | B1 * | 7/2022 | Wong | ........................ H04L 1/18 |
| 2011/0022699 | A1 * | 1/2011 | Powell | ............. H04L 12/40039 709/224 |
| 2014/0050075 | A1 * | 2/2014 | Diab | ..................... H04L 5/0007 370/201 |
| 2017/0142769 | A1 * | 5/2017 | Gilbert | .................. H04W 76/15 |
| 2017/0324657 | A1 * | 11/2017 | Zhong | .................. H04L 1/0011 |

(Continued)

FOREIGN PATENT DOCUMENTS

| CN | 114008933 A | * | 2/2022 | ........... H04B 7/0695 |
| EP | 3860045 A1 | * | 8/2021 | ............. H04L 12/12 |

(Continued)

*Primary Examiner* — Chi H Pham
*Assistant Examiner* — Vladislav Y Agureyev

(57) ABSTRACT

A physical layer transceiver for a node in a wireline communication system includes receiver circuitry for receiving communications from a link partner on a first link path, transmitter circuitry for transmitting communications to the link partner on a second link path, and an energy-efficient Ethernet (EEE) controller for reducing power consumption on the first or second link path, when activity on that link path is reduced. In a low-power mode, there are periodic refresh intervals of a first duration, during which signals are received or transmitted, and, between the refresh intervals, quiet intervals of a second, longer, duration, during which transmission and reception of signals are avoided. The EEE controller detects a change in an environmental condition affecting that link path, and upon detection of that change, adjusts a parameter of the low-power mode on at least one of the first and second link paths.

20 Claims, 8 Drawing Sheets

(56) References Cited

U.S. PATENT DOCUMENTS

| | | | | |
|---|---|---|---|---|
| 2018/0232031 A1* | 8/2018 | Swierk | ................... | H04L 67/12 |
| 2020/0106506 A1* | 4/2020 | Bhamidipati | ........ | H04B 7/0456 |
| 2020/0154310 A1* | 5/2020 | Sanderovich | ......... | H04L 65/762 |
| 2020/0177522 A1* | 6/2020 | Lo | .......................... | H04L 49/20 |
| 2021/0105160 A1* | 4/2021 | Lo | ....................... | H04N 21/262 |
| 2021/0234592 A1* | 7/2021 | Ashrafi | ................ | H04B 7/0617 |
| 2021/0311247 A1* | 10/2021 | Parsons | ................... | G02B 6/26 |

FOREIGN PATENT DOCUMENTS

| | | | | |
|---|---|---|---|---|
| WO | WO-2015085540 A1 * | 6/2015 | ........... | G06F 1/3278 |
| WO | WO-2020093835 A1 * | 5/2020 | ............. | H04L 12/12 |
| WO | WO-2020234161 A1 * | 11/2020 | ............. | H04L 12/12 |

* cited by examiner

ENERGY-EFFICIENT ETHERNET TRANSCEIVER THAT ADJUSTS BASED ON ENVIRONMENTAL CONDITIONS

Cross Reference to Related Applications

This disclosure claims the benefit of copending, commonly-assigned U.S. Provisional Patent Application No. 62/976,981, filed Feb. 14, 2020, which is hereby incorporated by reference herein in its entirety.

Field of Use

This disclosure relates to a physical layer transceiver (PHY) for energy-efficient Ethernet (EEE). More particularly, this disclosure relates to an EEE-capable PHY that can detect changing environmental conditions during EEE mode and change the operation of the EEE mode in response.

Background

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

Wireline communication links operating under the IEEE 802.3 standard, commonly referred to as "Ethernet," may include a feature known as Energy-Efficient Ethernet ("EEE") that allows link partners to save energy, if the physical layer transceivers (PHYs) of both link partners support EEE at the speed at which the link is established. EEE can reduce power consumption during periods of low data activity, while preserving a link in a fast-changing environment, so that data can be transmitted without error when data becomes available and causes the link to awaken.

An EEE link achieves energy savings by having each PHY enter a Low-Power Idle (LPI) mode. When a PHY is in LPI mode, the PHY cannot transmit or receive regular data signals, but only "sleep" and "refresh" (or "wake/alert") signals. Each PHY on an EEE link will enter LPI mode after a predetermined interval (the LPI "enter time-out") of inactivity following a "sleep" signal sent by that PHY (to give time for any link-partner PHY that wants to transmit to so do before the first PHY times out and enters LPI mode). PHYs on a link in LPI mode send out periodic signals during "refresh" intervals but are otherwise dormant. When one of the PHYs on a link that is in LPI mode needs to start transmitting, that PHY first transmits a "wake/alert" signal, and then waits for a predetermined period (the LPI "exit time-out") to elapse (to give time for the link-partner PHY to also awaken) before that PHY exits from LPI mode and starts transmitting regular data traffic. EEE behavior, including values of the enter time-out and the exit time-out, as well as the duration of each refresh interval and of the quiet intervals between refresh intervals, are governed by, for example, the IEEE 802.3ch standard.

However, Ethernet connections are being introduced in environments (such as automotive environments) in which conditions (e.g., temperature, vibration and mechanical stress on a channel medium) may change more severely and less predictably than in stable environments for which EEE standards were originally developed. The consequences of such rapid and unpredictable environmental changes could range from suboptimal performance and excess power consumption to something as severe as loss of a link.

Summary

In accordance with implementations of the subject matter of this disclosure, a physical layer transceiver for a node in a wireline communication system includes receiver circuitry configured to receive communications from a link partner on a first link path, transmitter circuitry configured to transmit communications to the link partner on a second link path, an energy-efficient Ethernet controller configured to reduce power consumption on one of the first link path and the second link path, when activity on the one of the first link path and the second link path is reduced, by entering, on the one of the first link path and the second link path, a low-power mode characterized by (i) periodic refresh intervals of a first duration, during which signals are received or transmitted, and (ii) between the refresh intervals, quiet intervals during which transmission and reception of signals are avoided, the quiet intervals being of a second duration longer than the first duration, where the energy-efficient Ethernet controller is further configured to detect a change in an environmental condition affecting one of the first link path and the second link path, and upon detection of the change in the environmental condition affecting the one of the first link path and the second link path, adjust a parameter of the low-power mode on at least one of the first link path and the second link path.

In a first implementation of such a physical layer transceiver, the physical layer transceiver may connect the first link path and the second link path to a common channel medium.

In a second implementation of such a physical layer transceiver, the energy-efficient Ethernet controller may be configured to detect a change in environmental conditions affecting the one of the first link path and the second link path by monitoring power at one or more locations on the one of the first link path and the second link path, and observing changes in monitored power at one or more of the one or more locations.

In a third implementation of such a physical layer transceiver, the energy-efficient Ethernet controller may be configured to detect a change in environmental conditions affecting the one of the first link path and the second link path by monitoring signal to noise ratio on the one of the first link path and the second link path.

In a fourth implementation of such a physical layer transceiver, the energy-efficient Ethernet controller may be configured to transmit refresh signals during the refresh intervals, and adjust parameters of the low-power mode on the one of the first link path and the second link path by changing rates of adaptation in signals transmitted during the refresh intervals.

In a fifth implementation of such a physical layer transceiver, the energy-efficient Ethernet controller may be configured to transmit refresh signals during the refresh intervals, and adjust parameters of the low-power mode on the one of the first link path and the second link path by changing timing of (i) the refresh intervals and (ii) the quiet intervals.

In a first instance of that fifth implementation, the energy-efficient Ethernet controller may be configured to change one or both of ON times and OFF times of a signal transmitted during the refresh intervals.

In a second instance of that fifth implementation, the energy-efficient Ethernet controller may be configured to change at least one of the first duration and the second duration.

In a variant of that second instance, the energy-efficient Ethernet controller may be configured to transmit a signal during at least one of the refresh intervals including an instruction to a second energy-efficient Ethernet controller, in a second node of the wireline communication system, to change at least one of the first duration and the second duration.

According to that variant, the energy-efficient Ethernet controller may be configured to transmit the signal during at least one of the refresh intervals, to instruct the second energy-efficient Ethernet controller in the second node, by changing polarity of a waveform of one of the signals transmitted in the at least one of the refresh intervals.

A wireline communication system according to implementations of the subject matter of this disclosure includes a first node and a second node, each node having a respective physical layer transceiver, where each respective physical layer transceiver in a respective one of the first node and the second node includes respective receiver circuitry configured to receive communications from another one of the first node and the second node, respective transmitter circuitry configured to transmit communications to the other one of the first node and the second node, and sensors configured to detect a change in an environmental condition affecting a link path between the first node and the second node, where the respective transmitter circuitry in a respective one of the first node and the second node is configured to, upon detection of the change in the environmental condition affecting the link path, adjust parameters of the link path.

In a first implementation of such a wireline communication system, the respective transmitter circuitry in a respective one of the first node and the second node may be configured to, upon detection of the change in the environmental condition affecting the link path, change timing of refresh intervals and quiet intervals of a low-power mode.

In a first instance of that first implementation, the respective transmitter circuitry in a respective one of the first node and the second node may be configured to, upon detection of the change in the environmental condition affecting the link path, change one or both of ON times and OFF times of a signal transmitted during the refresh intervals.

In a second instance of that first implementation, the respective transmitter circuitry in a respective one of the first node and the second node may be configured to, upon detection of the change in the environmental condition affecting the link path, signal the respective other one of the first node and the second node to change at least one of duration of the refresh intervals and duration of the quiet intervals.

In a third instance of that third implementation, the respective transmitter circuitry in a respective one of the first node and the second node may be configured to, upon detection of the change in the environmental condition affecting the link path, signal the respective other one of the first node and the second node by changing polarity of a waveform of a signal transmitted in the at least one of the refresh intervals.

A method according to implementations of the subject matter of this disclosure, for reducing power consumption on a link path between a physical layer transceiver of a node in a wireline communication system and a link partner in the wireline communication system, includes detecting changes in an environmental condition affecting the link path, and upon detecting the change in the environmental condition affecting the link path, adjusting parameters of a low-power mode on the link path.

In a first implementation of such a method, the detecting may include monitoring power at one or more locations on the link path, and observing changes in monitored power at one or more of the one or more locations.

In a second implementation of such a method, the detecting may include monitoring signal to noise ratio on the link path.

In a third implementation of such a method, the adjusting may include changing rates of adaptation in signals transmitted during refresh intervals of the low-power mode.

In a fourth implementation of such a method, the adjusting may include changing timing of refresh intervals and quiet intervals.

In a first instance of the fourth implementation, changing timing of the refresh intervals and the quiet intervals may include changing one or both of ON times and OFF times of signals transmitted during the refresh intervals.

In a second instance of the fourth implementation, the changing timing of the refresh intervals and the quiet intervals may include changing at least one of duration of the refresh intervals and duration of the quiet intervals.

In a variant of that second instance, changing the ratio may include transmitting a signal during at least one of the refresh intervals to instruct a link partner to change the at least one of the duration of the refresh intervals and the duration of the quiet intervals.

According to that variant, transmitting the signal may include changing polarity of a waveform of a signal transmitted in the at least one of the refresh intervals.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
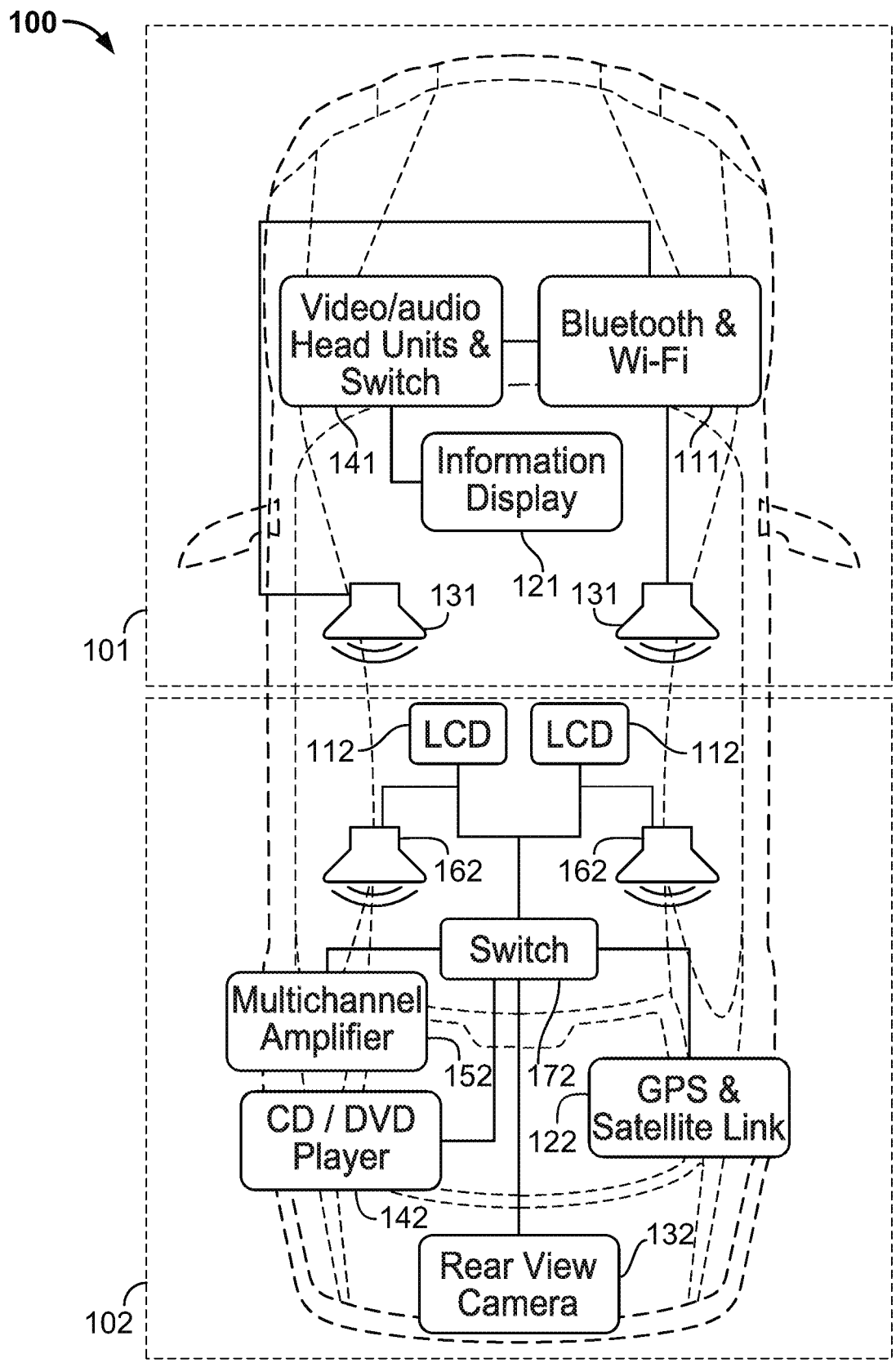
FIG. 1 shows an example of an environment in which implementations of the subject matter of this disclosure may be used.

As noted above, Ethernet wireline connections are being introduced in environments (such as automotive environments) in which conditions (e.g., temperature, vibration and mechanical stress on a channel medium) may change more severely and less predictably than in stable environments for which EEE standards were originally developed. The consequences of such rapid and unpredictable environmental changes could range from suboptimal performance and excess power consumption to something as severe as loss of a link.

Typically, when EEE is activated on a link (based, e.g., on data activity falling below a threshold), the link enters a Low-Power Idle (LPI) mode. During LPI mode, each PHY on the link enters a Quiet-Refresh cycle, in which long periods or intervals of quiet are separated by periodic transmission of signals during refresh intervals. Power is saved by turning off most of each PHY during the quiet intervals. During each refresh interval, the PHY wakes up long enough to keep the link active, and during that time, senses conditions on the link and sends signals to adapt filter circuitry (e.g., equalizers and echo cancellation) and timing circuitry (e.g., clock-data recovery) to any detected changes in conditions.

The durations of the quiet intervals and the refresh intervals are predetermined by EEE standards (including the aforementioned IEEE 802.3ch standard), and the standards do not provide for those durations to be adjusted to account for environmental change. As a result, during periods where there is very little change on the channel, a PHY may be updating more frequently than necessary (because the refresh intervals occur too often), which wastes power. Conversely, a PHY may be updating less frequently than necessary when there are many changes on the channel (because the refresh intervals do not occur often enough). As a result, one or more of the PHYs may be unable to follow the channel, resulting in a higher-than-acceptable bit-error rate, or the PHY may be able to keep up but only by consuming more resources—including power—than is desirable.

Therefore, in accordance with implementations of the subject matter of this disclosure, an EEE-capable PHY may be made environmentally aware, and capable of adjusting EEE operation to account for changing environmental conditions. Monitoring or detection of environmental conditions may be performed by measuring various power and/or signal quality metrics (at least some of which may have been, and may continue to be, provided in the PHY for other purposes), such as slicer input signal power, slicer error power, analog-to-digital converter (ADC) output signal power, and signal-to-noise ratio (SNR) power at the slicer. Certain values, or combinations of values, of one or more of those metrics may be predetermined to indicate changing environmental conditions that require channel adjustments.

The resulting channel adjustments may include some or all of (1) adjusting the rate of adaptation of equalizer circuitry, echo cancellation circuitry, and/or timing recovery (e.g., CDR) circuitry, (2) adjusting the ON/OFF times of certain circuitry within the refresh intervals (i.e., having some portions of each PHY active for more or less of the refresh interval than nominally expected), and (3) adjusting the times and/or durations of occurrences of the quiet intervals and the refresh intervals. The option of adjusting the times and/or durations of occurrences of the quiet intervals and the refresh intervals requires communication between two link partner nodes because if a first node changes those times and/or durations without informing its link partner, the link partner will be expecting "refresh" signals from the first node when the second node believes the refresh intervals should occur, but the first node will be sending those refresh signals during refresh intervals occurring at times other than the times expected by the second node. Therefore, the option of adjusting the times and/or durations of occurrences of the quiet intervals and the refresh intervals can be used only when both nodes are capable of environmentally-aware EEE operation. However, the other options can be used by any node that is capable of environmentally-aware EEE operation, even if its link partner node is not capable of environmentally-aware EEE operation.

The subject matter of this disclosure may be better understood by reference to FIGS. 1-9.

FIG. 1 shows an example of an environment in which implementations of the subject matter of this disclosure may be used. While the subject matter of this disclosure may have relevance in any kind of environment, the ability of a network to adjust to environmental conditions is particularly advantageous in an automotive environment 100, where a vehicle may be subject to substantial shock and vibration from uneven road surfaces, as well as extremes of temperature (particularly when the vehicle is parked in very hot or very cold weather—some systems such as security systems, as well as remote entry and remote start systems, remain active when the vehicle is parked).

The illustrated automotive environment 100 includes two separate networks—forward network 101 and rear network 102. Forward network 101 includes various sensors and circuits for engine control (not shown), as well as BLUETOOTH and Wi-Fi unit 111, dashboard display 121, and speakers 131, all coupled to video/audio-head-units-and-switch 141. Rear network 102 includes displays 112, GPS and satellite link unit 122, rear-view camera unit 132, CD/DVD player 142, multichannel amplifier 152, and speakers 162 all coupled to switch 172. Both networks 101, 102 are subject to fluctuating environmental conditions, although link difficulties in forward network 101, which links engine and driving control functions, may have more serious consequences than difficulties in rear network 102.

Figure 2:
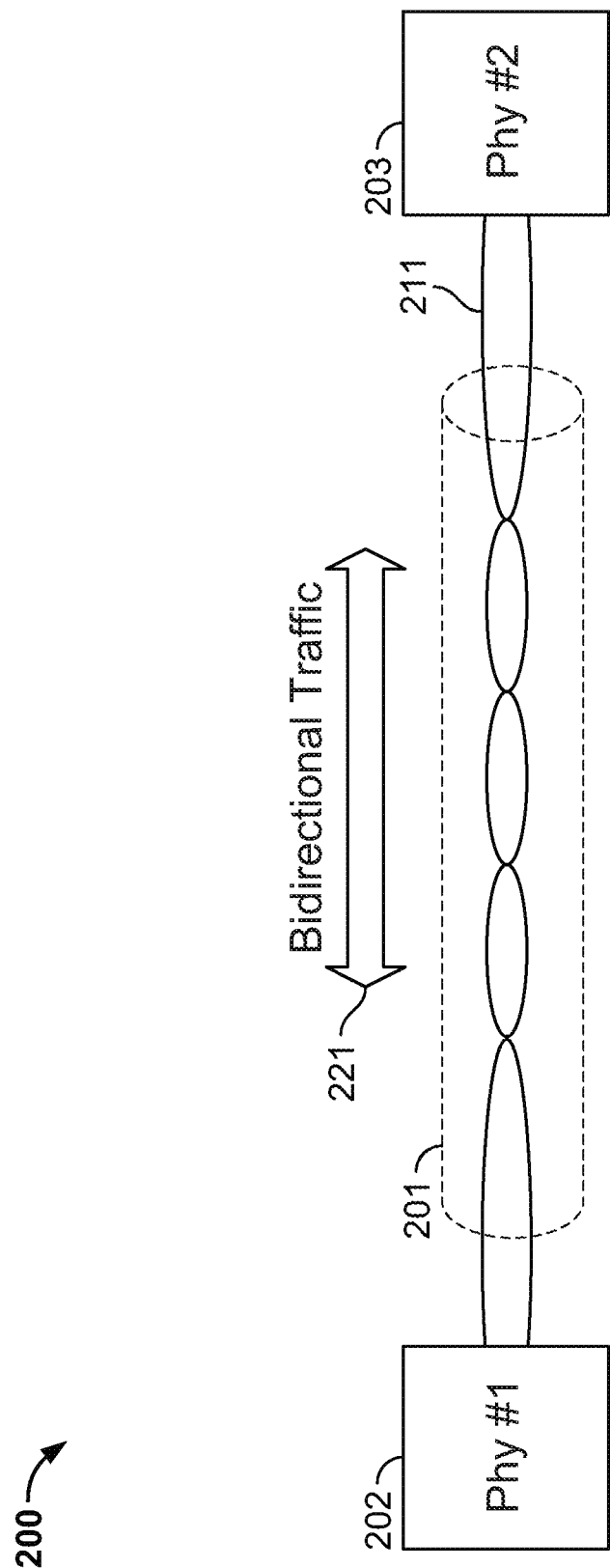
FIG. 2 shows an example structure of a link on which implementations of the subject matter of this disclosure may be used.
Figure 3:
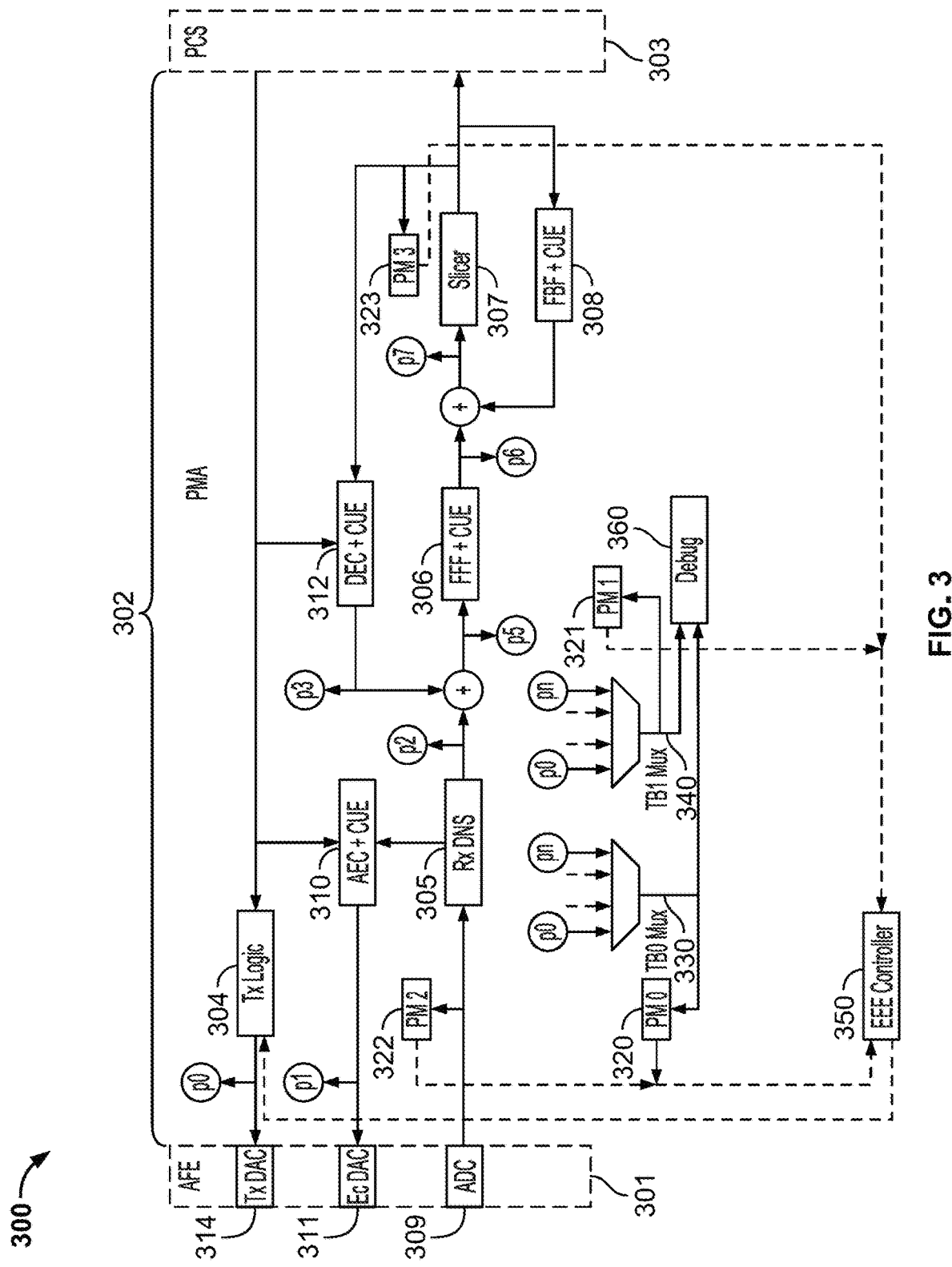
FIG. 3 shows an implementation of a physical layer transceiver incorporating the subject of this disclosure.

Any individual link in network 101 or network 102 may have the structure 200 shown in FIG. 2. A channel medium 201, which may be a shielded or unshielded twisted wire pair 211, or may be a coaxial or fiber cable (not shown), carries bidirectional traffic 221 between two link partners, each of which includes a PHY 202, 203. Each PHY 202, 203 may have the structure 300 shown in FIG. 3, including an analog front end (AFE) 301, a physical medium attachment (PMA) module 302, and a Physical Coding Sublayer (PCS) module 303. Although PMA module 302 is modified as described below to implement the subject matter of this disclosure, the basic structure and function of AFE 301, PMA module 302 and PCS module 303 in a PHY—but for those modifications—are well-known and well-understood.

In particular, in the transmit path of PMA module 302, transmit logic 304 couples PCS module 303 to transmitter digital-to-analog converter 314 of AFE 301. In the receive path of PMA module 302, optional receiver down-sampler 305, feed-forward filter 306 and slicer 307, as well as optional feedback filter 308 on the output of slicer 307, couple receiver analog-to-digital converter (ADC) 309 to PCS module 303. To cancel echoes between the transmit path and the receive path, at the analog end, analog echo canceller (AEC) 310 is coupled to both paths and to echo digital-to-analog converter (Ec DAC) 311, and at the digital end, digital echo canceller (DEC) 312 is coupled to both paths (in the receive path, DEC 312 is coupled in a feedback arrangement from the output of slicer 307 to the input of feed-forward filter 306).

In accordance with implementations of the subject matter of this disclosure, four power meters 320, 321, 322, 323 are used to detect changes in environmental conditions. One or more of power meters 320, 321, 322, 323 may be provided for other purposes as well, and in other implementations more or fewer power meters may be provided. In the implementation illustrated in FIG. 3, power meter 322 monitors power on the output of ADC 309, and power meter 323 monitors power on the output of slicer 307. In addition, power meter 320 monitors power on Test Bus 0 (TB0) 330, which is normally used for debugging (360) and can sample any of n+1 points p0, p1, . . . , pn, including any of points p0 through p7, as well, potentially, as additional points not relevant to the subject matter of this disclosure. Similarly, power meter 321 monitors power on Test Bus 1 (TB1) 340, which, like TB0 330, is normally used for debugging (360) and can sample any of n+1 points p0, p1, . . . , pn, including any of points p0 through p7, as well, potentially, as additional points not relevant to the subject matter of this disclosure. A signal-to-noise ratio (SNR) may be computed in software or firmware of the EEE controller module 350. An increase in the signal-to-noise ratio to above a predetermined threshold, or a decrease in the signal-to-noise ratio to below the predetermined threshold can indicate an environmental change that requires changing the EEE behavior of the system.

Figure 4:
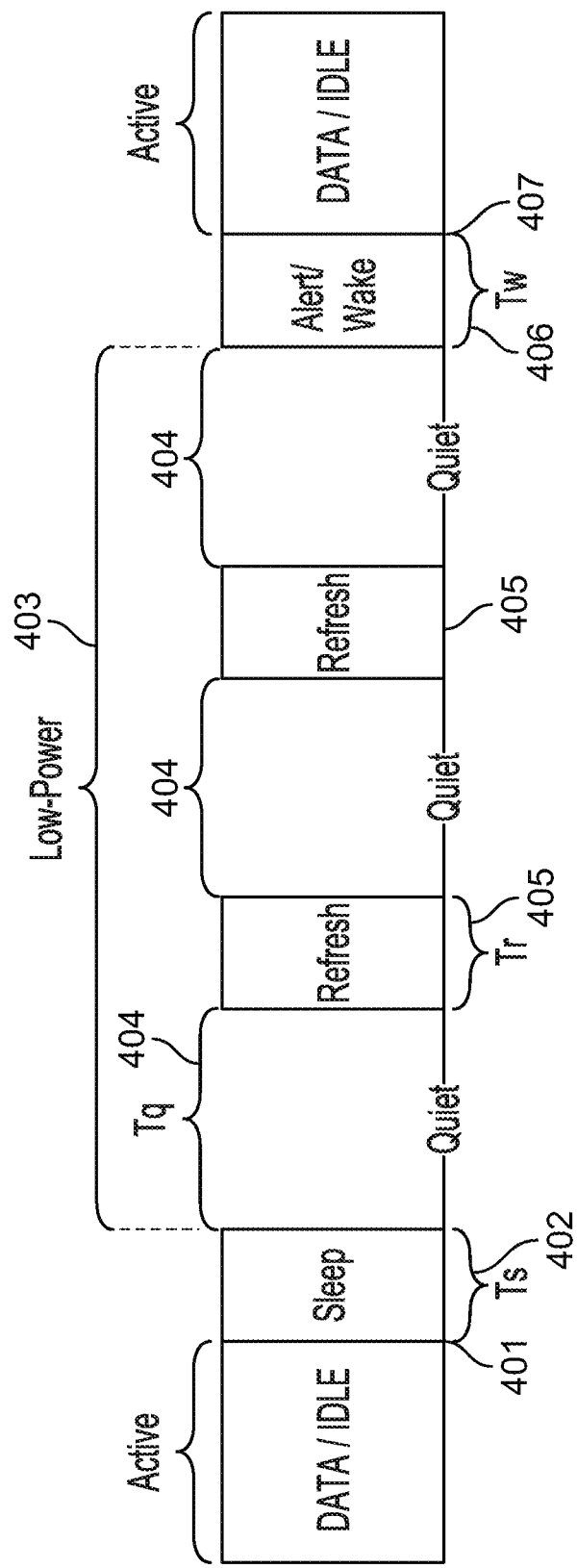
FIG. 4 is a graphical representation of energy-efficient Ethernet operation on a communication link.

Typical EEE behavior is illustrated in FIG. 4. Up to time 401, a channel may be active, with data being transmitted normally along respective link paths in either direction. If LPI mode is triggered on a particular link path at time 401, the PHY in which LPI mode is triggered issues a sleep signal 402 for a duration $T_s$, advising that PHY's link partner that the PHY is about to enter LPI mode (and giving the link partner time to respond—e.g., by sending data to prevent entry into LPI mode). The link will then enter a period 403 of quiet intervals 404 each of duration $T_q$, separated by refresh intervals 405 each of duration $T_r$. The interval durations are not illustrated to scale in FIG. 4. For example, $T_q$ is typically about 95 times as long as $T_r$ (30.4 μs vs. 320 ns for a 10GBASE-T1 channel), while $T_s$ is typically about 2.56 μs for a 10GBASE-T1 channel. When LPI mode is about to end, the PHY sends, during alert/wake interval 406 of duration $T_w$, an "alert" pulse of duration 1.28 μs followed by a "wake" pulse of duration 2.56 μs, signaling to its link partner that the link partner should be prepared to resume normal operations at time 407. Although only three quiet intervals 404 and corresponding refresh intervals 405 are shown during LPI period 403, typically there will be hundreds or thousands of quiet intervals 404 and refresh intervals 405 in any LPI period 403.

During each refresh interval 405, the PHY wakes up sufficiently to measure the channel and adapt equalizer filters 306, 308, echo cancellers 310, 312, and/or timing recovery circuits (e.g., CDR; not shown), using, in these examples, built-in coefficient update engines (CUEs) in those circuits. In accordance with implementations of the subject matter of this disclosure, if the channel measurements indicate a sufficient change in environmental conditions (e.g., based on a threshold), then one potential reaction of the EEE circuitry would be to change the rates of adaptation of equalizer filters 306, 308, echo cancellers 310, 312, and/or the timing recovery circuits. Another reaction could be to change the ON/OFF times of circuitry that is activated during refresh intervals 405—i.e., quiet intervals 404 and refresh intervals 405 would still occur at the time intervals expected by the link partner, based on a standard or on a previous negotiation—but the portion of each refresh interval 405 that is used by the PHY could change. A third reaction could be to change the times at which quiet intervals 404 and refresh intervals 405 occur and/or the respective durations of the quiet intervals 404 and refresh intervals 405. In some implementations, this adjustment may involve changing the ratio of the durations of each quiet interval 404 to the duration of each refresh interval 405, but the adjustment could involve changing at least one of the times at which quiet intervals 404 and refresh intervals 405 occur, and at least one of the respective durations of the quiet intervals 404 and refresh intervals 405, without changing the ratio of the respective durations—e.g., if the durations of the refresh intervals are halved, and the durations of the quiet intervals also are halved, refresh intervals will occur twice as often but the ratio of the duration of each quiet interval to the duration of each refresh interval will be unchanged. This last option—changing the ratios and/or durations of quiet intervals 404 and refresh intervals 405—is the most drastic, and would require (a) the remote PHY of the link partner to similarly be able to change, at its end, when quiet intervals 404 and refresh intervals 405 occur, and (b) communication between the local PHY, and the remote PHY of the link partner, during one or more refresh intervals 405 on the original schedule.

The communication between the local PHY and the remote PHY to change the relative durations of the quiet intervals 404 and the refresh intervals 405 may include complex signaling by which each PHY instructs the other PHY as to what the new durations of the quiet intervals 404 and the refresh intervals 405 will be. Alternatively, there may be only two different combinations of the duration of each quiet interval 404 and the duration of each refresh interval 405, and the communication between the local PHY and the remote PHY to change the times at which quiet intervals 404 and refresh intervals 405 occur, and/or the respective durations of the quiet intervals 404 and the refresh intervals 405, may be a simple signal to switch from one relationship to the other. For example, the polarity of an existing signal in the refresh interval 405 can be reversed to signal that the relationship should be changed.

As noted above, each LPI period 403 has a duration that encompasses hundreds or thousands of quiet intervals 404 and refresh intervals 405. Although the sensing of environmental changes is described above as happening during one refresh interval 405, in practice the sensing of environmental changes more likely would occur over multiple refresh intervals 405 (except perhaps in a case of extreme change for which one refresh interval might be sufficient). Similarly, communication between a local PHY and a link partner remote PHY to change the relationship of the duration of each quiet interval 404 to the duration of each refresh interval 405 would likely occur over multiple refresh intervals 405.

The three reactions, described above, to environmental changes may be used in any order and any combination. However, in some implementations of the subject matter of this disclosure, the three reactions to environmental changes may be used in a hierarchical manner. Specifically, first, changing the rates of adaptation of equalizer filters 306, 308, echo cancellers 310, 312, and/or the timing recovery circuits could be tried. If that is not sufficient to bring the signal-to-noise ratio (or other indicator) to an acceptable level, then changing the ON/OFF times of circuitry that is activated during refresh intervals 405 could be tried. If that is still not enough to bring the signal-to-noise ratio (or other indicator) to an acceptable level, then changing the times at which quiet intervals 404 and refresh intervals 405 occur, and/or the respective durations of the quiet intervals 404 and the refresh intervals 405 (i.e., the relationship of the duration of each quiet interval 404 to the duration of each refresh interval 405) could be tried (assuming that both PHYs on the link are capable of doing so).

Figure 5:
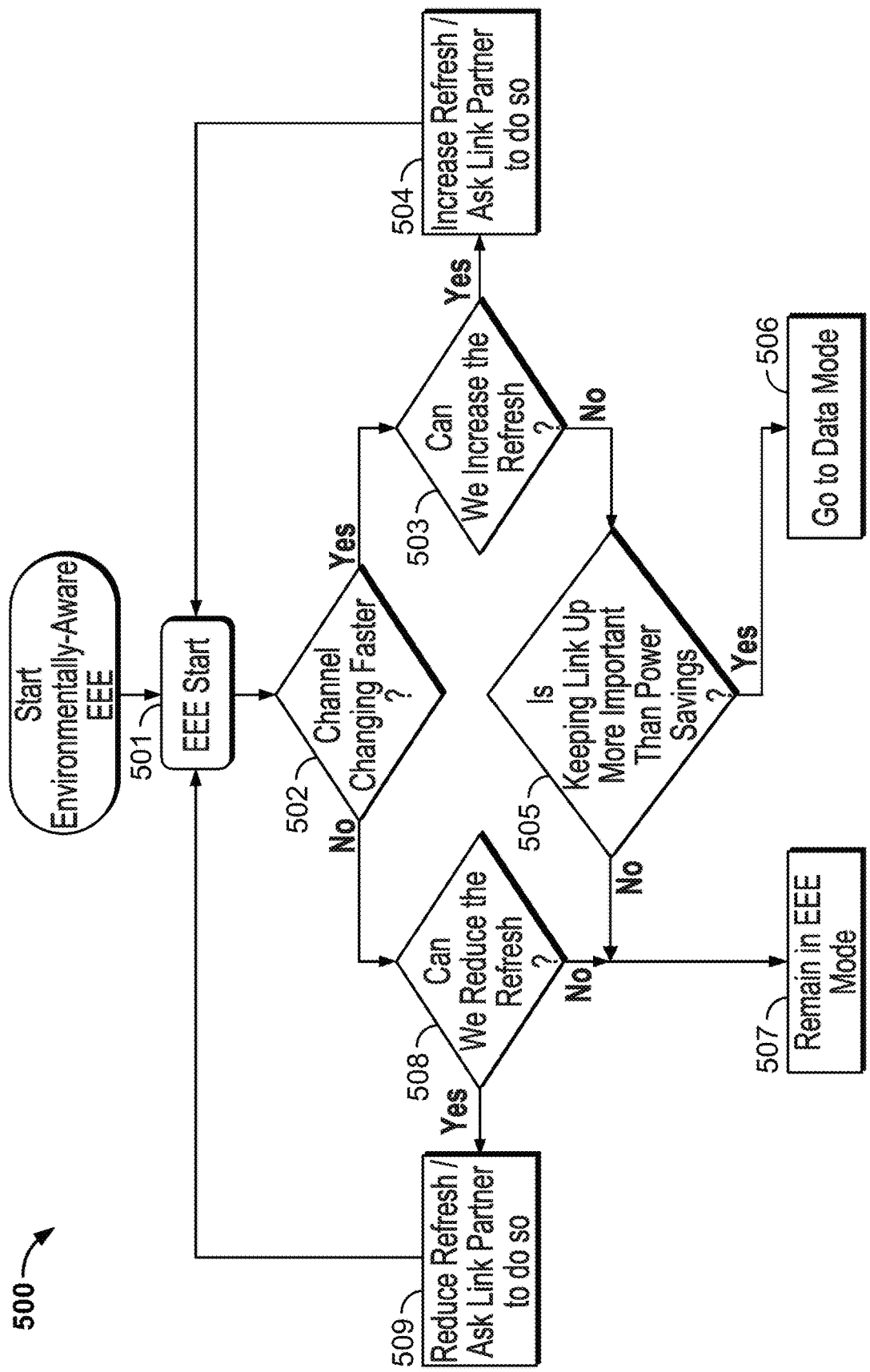
FIG. 5 is a flow diagram illustrating a method according to implementations of the subject matter of this disclosure for changing the relationship of the duration of a quiet interval to the duration of refresh interval in an energy-efficient Ethernet link.

One implementation of the changing of the relationship of the duration of quiet interval 404 to the duration of refresh interval 405 is diagrammed in FIG. 5. At 501, the process begins. At 502, it is determined whether the environmental conditions on the channel are changing more rapidly (i.e., the channel is getting worse). If so, then at 503 it is determined whether it is possible to increase the frequency at which refresh intervals 405 occur (i.e., that the frequency is not already at the maximum). If so, then at 504 the frequency at which refresh intervals 405 occur is increased, including communicating to the link partner to increase the frequency at which refresh intervals 405 occur, and flow returns to 501 to monitor the channel.

If at 503 it is determined that it is not possible to increase the frequency at which refresh intervals 405 occur (e.g., because the frequency is already at the maximum), then at 505 it is determined whether keeping the link running is more important than saving power. If so, then at 506 the link exits from EEE mode to regular data mode. If at 505 it is determined that saving power is more important than keeping the link running, then at 507 the link remains in EEE mode and operates as well as it can under the channel conditions.

If at 502, it is determined that the environmental conditions on the channel are changing less rapidly (i.e., the channel is getting better), then at 508 it is determined whether it is possible to reduce the frequency at which refresh intervals 405 occur (i.e., that the frequency is not already at the minimum). If so, then at 509 the frequency at which refresh intervals 405 occur is decreased, including communicating to the link partner to decrease the frequency at which refresh intervals 405 occur, and flow returns to 501 to monitor the channel. If at 508 it is determined that it is not possible to reduce the frequency at which refresh intervals 405 occur (e.g., because the frequency is already at the minimum), then at 507 the link remains in EEE mode and flow returns to 501 to monitor the channel.

Each of the local PHY and the remote PHY includes both a transmitter and a receiver. Thus, there are two parallel signal paths between the local PHY and the remote PHY. Although those two signal paths can be on separate physical channel media (e.g., on two separate conductors or sets of conductors), in many cases both signal paths operate on same physical channel medium.

In one of the signal paths, the local PHY is transmitting and the remote PHY is receiving. In the other of the signal paths, the local PHY is receiving and the remote PHY is transmitting. However, it is not necessary for both paths to be in Low-Power Idle mode at the same time. Thus, there may be situations in which both signal paths between the local PHY and the remote PHY are in Low-Power Idle mode, situations in which the signal path from the local PHY to the remote PHY is in Low-Power Idle mode but the signal path from the remote PHY to the local PHY is active data mode, and situations in which the signal path from the local PHY to the remote PHY is in active data mode but the signal path from the remote PHY to the local PHY is in Low-Power Idle mode.

Figure 6:
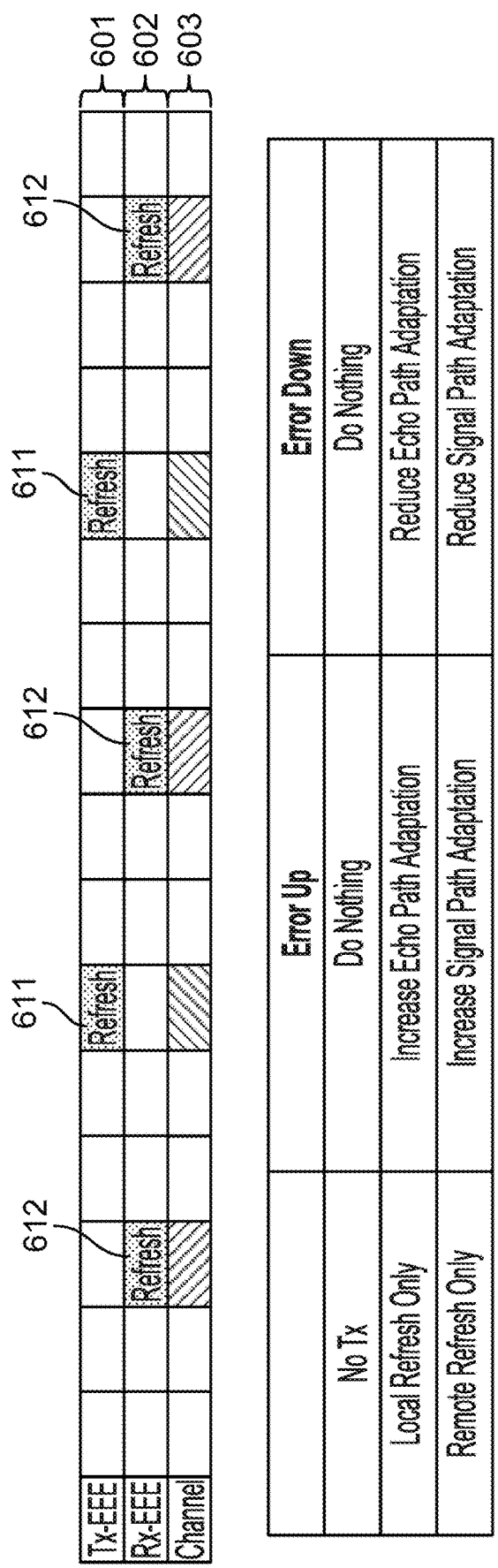
FIG. 6 shows the behavior of a first implementation of a physical layer transceiver for energy-efficient Ethernet according to the subject matter of this disclosure.
Figure 7:
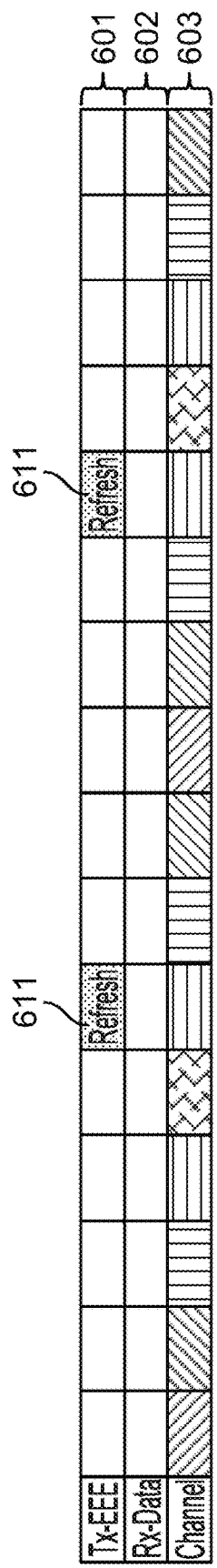
FIG. 7 shows the behavior of a second implementation of a physical layer transceiver for energy-efficient Ethernet according to the subject matter of this disclosure.
Figure 8:
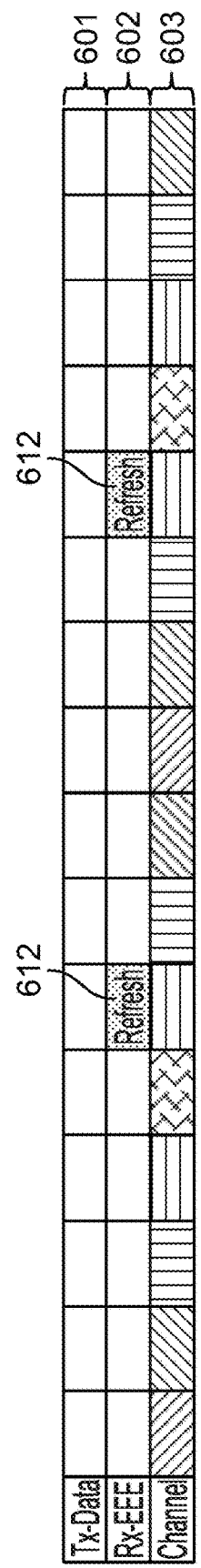
FIG. 8 shows the behavior of a third implementation of a physical layer transceiver for energy-efficient Ethernet according to the subject matter of this disclosure.

The behavior of PHYs, in which the subject matter of this disclosure is implemented, in each of the foregoing situations, is illustrated in FIGS. 6-8.

FIG. 6 shows the behavior in a situation in which both signal paths 601, 602 between the local PHY and the remote PHY are in Low-Power Idle mode. The two signal paths 601, 602 need not necessarily be synchronized, and in the implementation illustrated in FIG. 6, the refresh intervals 611 in the signal path 601 in which the local PHY is transmitting are not aligned with the refresh intervals 612 in the signal path 602 in which the local PHY is receiving. However, as seen at 603, because both transmit path 601 and receiver path 602 are in Low-Power Idle mode, there is no activity on the channel except for the refresh signals during respective refresh intervals 612.

In this situation, if there is no transmission, there is no reaction to an increase or a decrease in the bit-error rate. If there are local refresh signals—i.e., refresh signals 611 in the transmit path 601—then, insofar as echo cancellation corrects signal errors in the local circuitry, if the bit-error rate increases, echo cancellation adaptation is increased, and if the bit-error rate decreases, echo cancellation adaptation is decreased. Similarly, if there are remote refresh signals—i.e., refresh signals 612 in the receive path 602—then, if the bit-error rate increases, the error may originate remotely, on the signal path, and signal path adaptation is increased, and if the bit-error rate decreases, signal path adaptation is decreased.

FIG. 7 shows the behavior in a situation in which only the transmit path between the local PHY and the remote PHY is in Low-Power Idle mode, while normal communication, as shown at 603, is occurring on the receive path of the local PHY (receiving from the remote PHY). In this situation, if there are local refresh signals—i.e., refresh signals 611 in the transmit path 601—accompanied by remote data 603 on the receive path then if the bit-error rate increases, the error may be the result of the local refresh and, insofar as echo cancellation corrects signal errors in the local circuitry, echo cancellation adaptation is increased, and if the bit-error rate decreases, echo cancellation adaptation is decreased. Similarly, if there are no local refresh signals—i.e., the transmit path 601, which is in LPI mode, is idle—but there is remote data 603 on the receive path, then if the bit-error rate increases, the error must originate on the signal path from the remote PHY and, insofar as signal path adaptation corrects errors between the local PHY and the remote PHY, signal path adaptation is increased, and if the bit-error rate decreases, signal path adaptation is decreased.

FIG. 8 shows the behavior in a situation in which only the receive path between the local PHY and the remote PHY is in Low-Power Idle mode, while normal communication, as shown at 603, is occurring on the transmit path of the local PHY (transmitting to the remote PHY). In this situation, if there are remote refresh signals—i.e., refresh signals 612 in the receive path 602—accompanied by local data 603 on the transmit path, then if the bit-error rate increases, the error may originate in the remote PHY and, insofar as signal path adaptation corrects errors on the signal path between the local PHY and the remote PHY, signal path adaptation is increased, and if the bit-error rate decreases, signal path adaptation is decreased. Similarly, if there are no remote refresh signals—i.e., the receive path 602, which is in LPI mode, is idle—but there is local data 603 on the transmit path, then if the bit-error rate increases, the error must originate in the local PHY and, insofar as echo cancellation corrects signal errors in the local circuitry, echo cancellation adaptation is increased, and if the bit-error rate decreases, echo cancellation adaptation is decreased.

Figure 9:
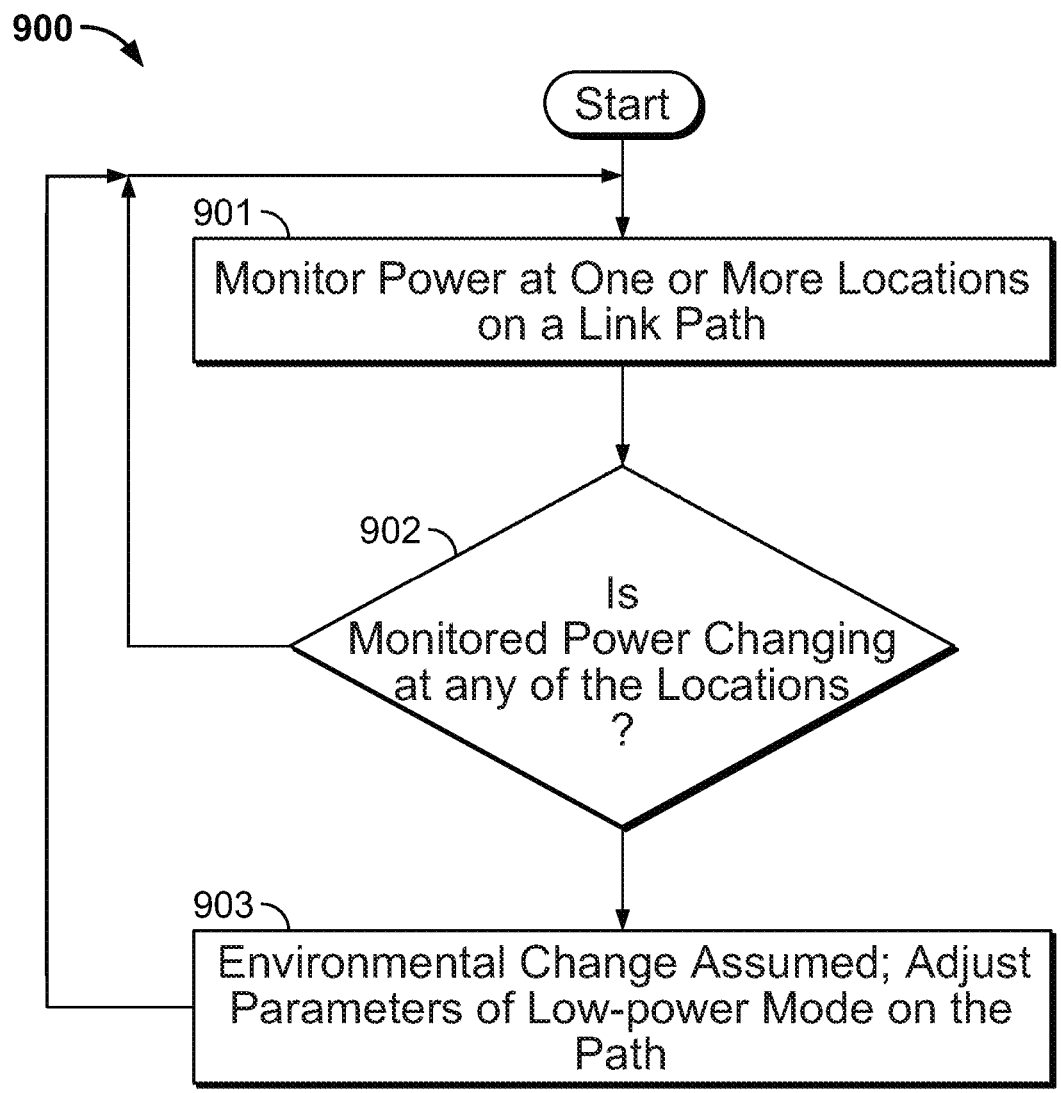
FIG. 9 is a flow diagram illustrating a method according to implementations of the subject matter of this disclosure.

FIG. 9 is a flow diagram illustrating an implementation 900 of a method in accordance with the subject matter of this disclosure, for reducing power consumption on a link path between a physical layer transceiver of a node in a wireline communication system and a link partner in the wireline communication system. Method 900 begins at 901 where power is monitored at one or more locations on the link path. At 902, it is determined whether monitored power at one or more of the locations is changing. If not, then flow returns to 901 to continue monitoring power at those locations. If at 902, monitored power at one or more of the locations is changing, then change in an environmental condition affecting the link path is assumed, and at 903, parameters of a low-power mode on the link path are adjusted, and flow returns to 901 to continue monitoring power at one or more locations on the link path.

Thus it is seen that an EEE-capable PHY that can detect changing environmental conditions during EEE mode and change the operation of the EEE mode in response has been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A physical layer transceiver for a node in a wireline communication system, the physical layer transceiver comprising:
   receiver circuitry configured to receive communications from a link partner on a first link path;
   transmitter circuitry configured to transmit communications to the link partner on a second link path; and
   an energy-efficient Ethernet controller configured to reduce power consumption on one of the first link path and the second link path, when activity on the one of the first link path and the second link path is reduced, by entering, on the one of the first link path and the second link path, a low-power mode characterized by:
     (i) periodic refresh intervals of a first duration, during which signals are received or transmitted, and
     (ii) between the refresh intervals, quiet intervals during which transmission and reception of signals are avoided, the quiet intervals being of a second duration longer than the first duration,
   wherein the energy-efficient Ethernet controller is further configured to:
     detect a change in an environmental condition affecting one of the first link path and the second link path by:
       monitoring at least one of power at one or more locations on the one of the first link path and the second link path, and signal to noise ratio on the one of the first link path and the second link path, and
       observing that the at least one of the monitored power at one or more of the one or more locations, and the monitored signal to noise ratio, have values predetermined to indicate changing environmental conditions; and
     upon detection of the change in the environmental condition affecting the one of the first link path and the second link path, adjust a parameter of the low-power mode on at least one of the first link path and the second link path.

2. The physical layer transceiver of claim 1, wherein the physical layer transceiver connects the first link path and the second link path to a common channel medium.

3. The physical layer transceiver of claim 1, wherein the energy-efficient Ethernet controller is configured to:
   transmit refresh signals during the refresh intervals; and
   adjust parameters of the low-power mode on the one of the first link path and the second link path by changing rates of adaptation in signals transmitted during the refresh intervals.

4. The physical layer transceiver of claim 1, wherein the energy-efficient Ethernet controller is configured to:
   transmit refresh signals during the refresh intervals; and
   adjust parameters of the low-power mode on the one of the first link path and the second link path by changing timing of (i) the refresh intervals and (ii) the quiet intervals.

5. The physical layer transceiver of claim 4, wherein the energy-efficient Ethernet controller is configured to change one or both of ON times and OFF times of a signal transmitted during the refresh intervals.

6. The physical layer transceiver of claim 4, wherein the energy-efficient Ethernet controller is configured to change at least one of the first duration and the second duration.

7. The physical layer transceiver of claim 6, wherein the energy-efficient Ethernet controller is configured to transmit a signal during at least one of the refresh intervals including an instruction to a second energy-efficient Ethernet controller, in a second node of the wireline communication system, to change at least one of the first duration and the second duration.

8. The physical layer transceiver of claim 7, wherein the energy-efficient Ethernet controller is configured to transmit the signal during at least one of the refresh intervals, to instruct the second energy-efficient Ethernet controller in the second node, by changing polarity of a waveform of one of the signals transmitted in the at least one of the refresh intervals.

9. A wireline communication system comprising:
   a first node and a second node, each node having a respective physical layer transceiver, each respective physical layer transceiver in a respective one of the first node and the second node including:
     respective receiver circuitry configured to receive communications from another one of the first node and the second node;
     respective transmitter circuitry configured to transmit communications to the other one of the first node and the second node; and
     sensors configured to detect a change in an environmental condition affecting a link path between the first node and the second node, by:
       monitoring at least one of power at one or more locations on the one of the first link path and the second link path, and signal to noise ratio on the one of the first link path and the second link path, and
       observing that the at least one of the monitored power at one or more of the one or more locations, and the monitored signal to noise ratio, have values predetermined to indicate changing environmental conditions; wherein:

the respective transmitter circuitry in a respective one of the first node and the second node is configured to, upon detection of the change in the environmental condition affecting the link path, adjust parameters of the link path.

10. The wireline communication system of claim 9, wherein the respective transmitter circuitry in a respective one of the first node and the second node is configured to, upon detection of the change in the environmental condition affecting the link path, change timing of refresh intervals and quiet intervals of a low-power mode.

11. The wireline communication system of claim 10, wherein the respective transmitter circuitry in a respective one of the first node and the second node is configured to, upon detection of the change in the environmental condition affecting the link path, change one or both of ON times and OFF times of a signal transmitted during the refresh intervals.

12. The wireline communication system of claim 10, wherein the respective transmitter circuitry in a respective one of the first node and the second node is configured to, upon detection of the change in the environmental condition affecting the link path, signal the respective other one of the first node and the second node to change at least one of duration of the refresh intervals and duration of the quiet intervals.

13. The wireline communication system of claim 10, wherein the respective transmitter circuitry in a respective one of the first node and the second node is configured to, upon detection of the change in the environmental condition affecting the link path, signal the respective other one of the first node and the second node by changing polarity of a waveform of a signal transmitted in the at least one of the refresh intervals.

14. A method for reducing power consumption on a link path between a physical layer transceiver of a node in a wireline communication system and a link partner in the wireline communication system, the method comprising:

detecting changes in an environmental condition affecting the link path by:
monitoring at least one of power at one or more locations on the one of the first link path and the second link path, and signal to noise ratio on the one of the first link path and the second link path, and
observing that the at least one of the monitored power at one or more of the one or more locations, and the monitored signal to noise ratio, have values predetermined to indicate changing environmental conditions; and
upon detecting the change in the environmental condition affecting the link path, adjusting parameters of a low-power mode on the link path.

15. The method of claim 14, wherein the adjusting comprises changing rates of adaptation in signals transmitted during refresh intervals of the low-power mode.

16. The method of claim 14, wherein the adjusting comprises changing timing of refresh intervals and quiet intervals.

17. The method of claim 16, wherein the changing timing of the refresh intervals and the quiet intervals comprises changing one or both of ON times and OFF times of signals transmitted during the refresh intervals.

18. The method of claim 16, wherein the changing timing of the refresh intervals and the quiet intervals comprises changing at least one of duration of the refresh intervals and duration of the quiet intervals.

19. The method of claim 18, wherein changing the ratio comprises transmitting a signal during at least one of the refresh intervals to instruct a link partner to change the at least one of the duration of the refresh intervals and the duration of the quiet intervals.

20. The method of claim 19, wherein transmitting the signal comprises changing polarity of a waveform of a signal transmitted in the at least one of the refresh intervals.

\* \* \* \* \*